United States Patent [19]
Fukuroi et al.

[11] Patent Number: 6,083,081
[45] Date of Patent: Jul. 4, 2000

[54] LAPPING CONTROL SENSOR FOR MAGNETORESISTIVE EFFECT HEAD, LAPPING CONTROL METHOD USING THE SENSOR AND MANUFACTURING METHOD OF THE SENSOR

[75] Inventors: Osamu Fukuroi; Yoshiro Nakagawa, both of Tokyo, Japan

[73] Assignee: TDK Corporation, Tokyo, Japan

[21] Appl. No.: 09/130,446

[22] Filed: Aug. 6, 1998

[30]     Foreign Application Priority Data

Aug. 7, 1997  [JP]  Japan ................................ 9-224436

[51] Int. Cl.⁷ ........................................... B24B 49/00
[52] U.S. Cl. ................................... 451/5; 29/603
[58] Field of Search ............................ 451/5; 29/603

[56]              References Cited

U.S. PATENT DOCUMENTS 4,689,877   9/1987   Church .
5,023,991   6/1991   Smith ........................................... 29/603
5,479,308  12/1995   Voegeli et al. ........................... 360/113
5,894,385   4/1999   Gill et al. ................................. 360/113

FOREIGN PATENT DOCUMENTS 63-191570  8/1988   Japan .

*Primary Examiner*—David A. Scherbel
*Assistant Examiner*—Shantese McDonald
*Attorney, Agent, or Firm*—Arent Fox Kintner Plotkin & Kahn PLLC

[57]              ABSTRACT

A lapping control sensor for a MR head includes a multi-layered structure of a metallic layer, an insulation layer, a resister layer and a lead conductor layer, and being provided in parallel with the MR head which has a multi-layered structure of at least a lower shield layer, a shield gap insulation layer, a MR layer and a lead conductor layer is provided. The insulation layer of the lapping control sensor has a thickness larger than that of the shield gap insulation layer of the MR head. The thickness of the insulation layer of the sensor is 0.1 μm or more.

13 Claims, 6 Drawing Sheets

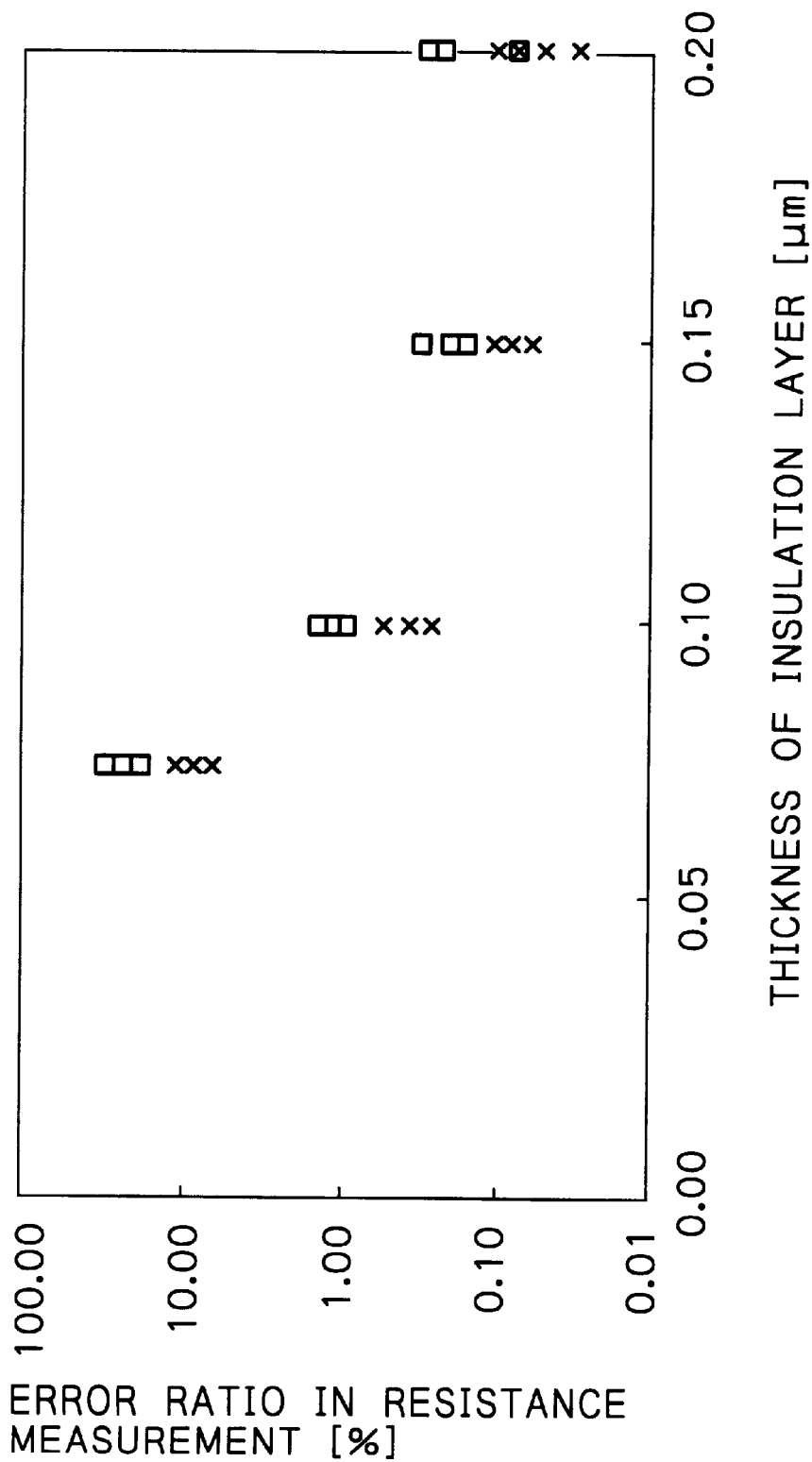

LAPPING CONTROL SENSOR FOR MAGNETORESISTIVE EFFECT HEAD, LAPPING CONTROL METHOD USING THE SENSOR AND MANUFACTURING METHOD OF THE SENSOR

FIELD OF THE INVENTION

The present invention relates to a lapping control sensor used in controlling a height of a magnetoresistive effect (MR) head (MR height) when the MR head is fabricated, to a lapping control method using the sensor and to a manufacturing method of the sensor.

DESCRIPTION OF THE RELATED ART

The MR height of a plurality of MR heads is collectively controlled by lapping one surface (ABS, Air Bearing Surface) of each bar obtained by cutting each row from a wafer so that the plurality of MR heads are aliened in one row. To control the mutual MR height of the plurality of MR heads of a bar and the mutual MR height of the MR heads of a plurality of bars to a corrective value, there are usually provided a plurality of lapping control sensors called as an electric lapping guide (ELG) or a resistance lapping guide (RLG) which detects the height of a lapped ABS surface, in each bar. The lapping of the ABS surface can be controlled in response to electric signals from the ELGs or RLGs.

Each of the ELGs or RLGs is mainly composed of a resister which is adjacent to the ABS surface to be lapped and extends in parallel. The ELG or RLG teaches an amount of lapping by changing its terminal voltage or its resistance due to the reduction of the height of the resister polished with polishing of the MR height. Such ELG with respect to the throat height of a magnetic pole gap in an inductive head, not to the MR height, is known by, for example, U.S. Pat. No. 4,689,877 and Japanese Unexamined Patent Publication No. 63(1988)-191570.

In manufacturing the MR head, the ELG or RLG is generally formed in the same process of manufacturing the MR head so as to have the same layered structure as that of the MR head. FIG. 1 shows a multi-layered structure of a conventional ELG or RLG. As shown in the figure, the conventional ELG or RLG has a multi-layered structure consisting of a metallic layer (shield layer) 10, an insulation layer (shield gap layer) 11, a resister layer (MR layer) 12 and lead conductors 13 and 14, which are made of the same material and layer thickness as those of the MR head.

Recently, in order to increase the bit density in a magnetic disk unit, narrower gap of the MR shield has been demanded. In order to make the shield gap narrower, it is necessary to decrease the thickness of the MR layer and/or the thickness of the shield gap insulation layer. However, there is a limit in decreasing the layer thickness of the MR layer because the characteristics of the head will be deteriorate. Thus, the thickness of the shield gap insulation layer sandwiching this MR layer has to be decreased. When the thickness of the shield gap insulation layer in the MR head is decreased, thickness of the insulation layer 11 in the ELG or RLG is also decreased as well.

When the thickness of the insulation layer 11 of the ELG or RLG is decreased as mentioned above, a short circuit may be formed temporarily between the lead conductors 13 and 14 via the metallic layer 10 and smears 15 (burrs) which may be protruded from the metallic layer 10 during the lapping control of the MR height. The smear metals 15 produced on the lapped surface of the metallic layer 10 are extended across the insulation layer 11 to contact the lead conductors 13 and 14 when the lapping direction is a direction of an arrow shown in FIG. 1, resulting in forming the electric short circuit between the metallic layer 11 and the lead conductors 13 and 14. When the short circuit is formed, resistance between the terminals of lead conductors 13 and 14, which is an ELG or RLG detecting output, is temporarily decreased and generates many noises in signals, resulting in that lapping for controlling of the MR height cannot be carried out.

In order to prevent the production of metallic smears when lapping the metallic layer, it may be considered to provide no metallic layer as an under layer of the ELG or RLG. However, if the resistor layer of the ELG or RLG has no under layer, it cannot have the same resistive change characteristics as the MR layer of the MR head due to differences between surface characteristics such as unevenness of the under layer. In order to enhance the controllability of the MR height, it is desirable that the resistor layer of the ELG or RLG and the MR layer of the MR element have the same resistive change characteristics.

In order to prevent the production of metallic smears when lapping the metallic layer, it is also considered that a lapping direction is set in the opposite direction to the direction of the arrow in FIG. 1. However, when the lapping direction is reversed, a recession between a substrate (slider) and an under film formed thereon becomes remarkably large causing the characteristics of the MR head itself to greatly deteriorate.

SUMMARY OF THE INVENTION

It is therefore an object of the present invention to provide a lapping control sensor which can securely and stably control a MR height of a MR head to a correct value.

It is another object of the present invention to provide a lapping control method using the sensor and a manufacturing method of the sensor.

According to the present invention, a lapping control sensor for a MR head, including a multi-layered structure of a metallic layer, an insulation layer, a resister layer and a lead conductor layer, and being provided in parallel with the MR head which has a multi-layered structure of at least a lower shield layer, a shield gap insulation layer, a MR layer and a lead conductor layer is provided. The insulation layer of the lapping control sensor has a thickness larger than that of the shield gap insulation layer of the MR head. The thickness of the insulation layer of the sensor is 0.1 µm or more.

Also, according to the present invention, a lapping control sensor for a MR head, including a multi-layered structure of a metallic layer, an insulation layer, a resister layer and a lead conductor layer, and being provided in parallel with the MR head which has a multi-layered structure of at least a lower shield layer, a shield gap insulation layer, a MR layer and a lead conductor layer. The metallic layer, the insulation layer, the resister layer and the lead conductor layer of the sensor are made of the same material as that of the lower shield layer, the shield gap insulation layer, the MR layer and the lead conductor layer of the MR head, respectively. The insulation layer of the lapping control sensor has a thickness larger than that of the shield gap insulation layer. The thickness of the insulation layer of the sensor is 0.1 µm or more.

Since an insulation layer of the lapping control sensor is formed so as to have a thickness of 0.1 µm or more which is thicker than the thickness of a shield gap insulation layer of the MR head, noise generation due to the metallic smears can be prevented. Accordingly, the MR height can be securely and stably controlled to a correct value.

According to the present invention, furthermore, a lapping control method using the above-mentioned sensor is provided. In this method, the lapping control of a height of the MR layer of the MR head is executed in response to a signal from the lapping control sensor.

According to the present invention, also, a method for manufacturing a lapping control sensor is provided. This method includes the steps of sequentially depositing a metallic layer and an insulation layer at a position in parallel with a MR head during depositing steps of a lower shield layer and a shield gap insulation layer of the MR head, in which the insulation layer of the sensor has a thickness larger than that of the shield gap insulation layer and the thickness of the insulation layer of the sensor is 0.1 μm or more, and sequentially depositing a resistor layer and a lead conductor layer on the insulation layer during depositing steps of a MR layer and a lead conductor layer of the MR head.

It is preferred that each of a plurality of lapping control sensors is located near the respective MR heads.

It is also preferred that the metallic layer, the insulation layer, the resister layer and the lead conductor layer of the sensor are made of the same material as that of the lower shield layer, the shield gap insulation layer, the MR layer and the lead conductor layer of the MR head, respectively.

Further objects and advantages of the present invention will be apparent from the following description of the preferred embodiments of the invention as illustrated in the accompanying drawings.

BRIEF DESCRIPTION OF THE DRAWINGS

FIG. 5 is a characteristic diagram illustrating the relationship between a thickness of an insulation layer of the lapping control sensor and an error ratio of resistance measurement;

DESCRIPTION OF THE PREFERRED EMBODIMENTS

Figure 1:
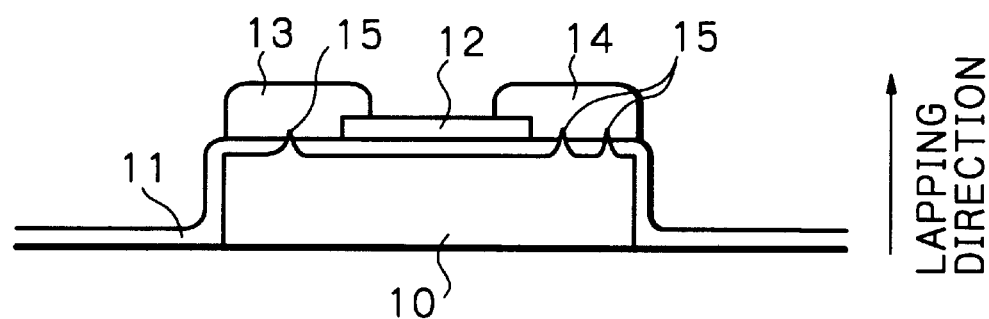
FIG. 1 is a cross-sectional view schematically showing a multilayered structure of a conventional lapping control sensor.
Figure 2:
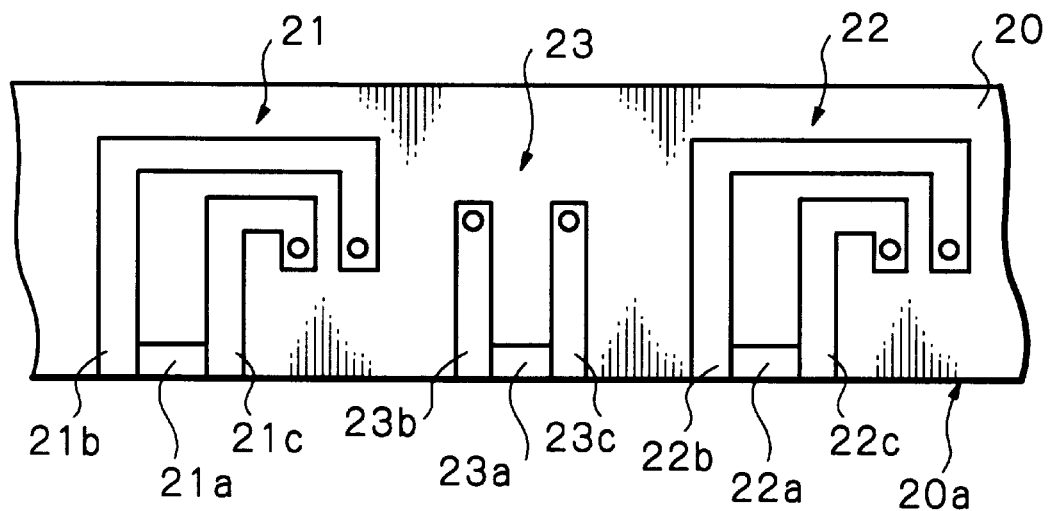
FIG. 2 is a view schematically showing a plane structure of a lapping control sensor of a preferred embodiment of the present invention.

FIG. 2 illustrates a plan view of MR heads and a lapping control sensor in a part of a bar obtained by cutting each of rows of a wafer in which numerous MR heads were arranged in a matrix. FIG. 2 is, however, a transparent view because an inductive head and the like have actually been mounted on the bar and thus these MR heads and the lapping control sensor cannot be directly seen from outside.

In the figure, reference numerals 20 and 20a denote the bar and the ABS surface to be lapped of the bar 20. Also, reference numerals 21 and 22 denote two of a plurality of MR heads formed in one row along the bar 20, 23 denotes one of lapping control sensors formed in a space between the MR heads in parallel therewith. In this case, it is desirable that another lapping control sensors are provided at both end portions of the bar 20.

In FIG. 2, furthermore, reference numerals 21a and 22a denote MR layers of the respective MR heads 21 and 22 formed on a shield gap insulation layer, 21b and 21c, and 22b and 22c denote lead conductors connected across the respective MR layers 21a and 22a. Also, reference numeral 23a denotes a resister layer of the lapping control sensor 23, and 23b and 23c denote lead conductors connected across the resistor layer 23a. As shown in the figure, the MR layers 21a and 22a and the resister layer 23a are disposed in parallel with the ABS surface 20a so that one sides of the layers are adjacent to the ABS surface 20a.

Figure 3:
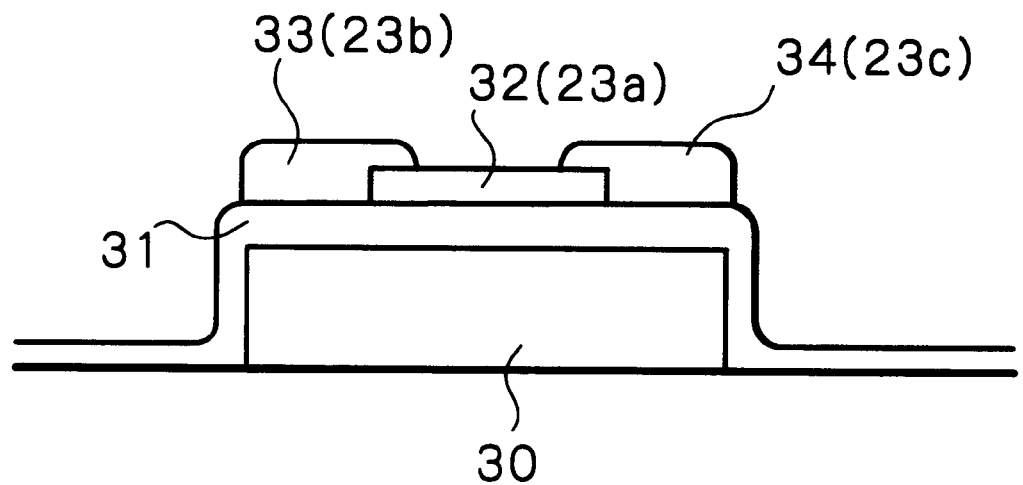
FIG. 3 is a cross-sectional view schematically showing the multi-layered structure of a lapping control sensor of FIG. 2.

FIG. 3 illustrates the multi-layered structure of the lapping control sensor 23 shown in FIG. 2. In FIG. 3, reference numeral 30 denotes a metallic layer made of the same material and provided with the same layer thickness as those of the lower shield layer of the MR head, and 31 denotes an insulation layer made of the same material as that of the shield gap insulation layer of the MR head but provided with a layer thickness of for example 0.1 μm which is larger than that of the lower shield layer of the MR head. Also reference numeral 32 (23a) denotes a resister layer made of the same material and provided with the same layer thickness as those of the MR layer of the MR head, and 33 and 34 (23b and 23c) denote lead conductors made of the same material and provided with the same layer thickness as those of the lead conductor of the MR head.

FIGS. 4a to 4d are cross-sectional views explaining a manufacturing method of the lapping control sensor of the embodiment shown in FIG. 2. The metallic layer 30 is first formed on an under layer (not shown). This metallic layer 30 is formed by the same processes as the formation of the lower shield layer of the MR head. Therefore, the layer 30 is formed made of the same material and provided with the same thickness as those of the lower shield layer.

Figure 4A:
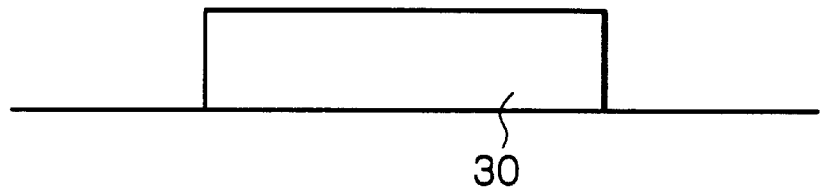
FIGS. 4a to 4d are cross-sectional views explaining the manufacturing method of the lapping control sensor.
Figure 4B:
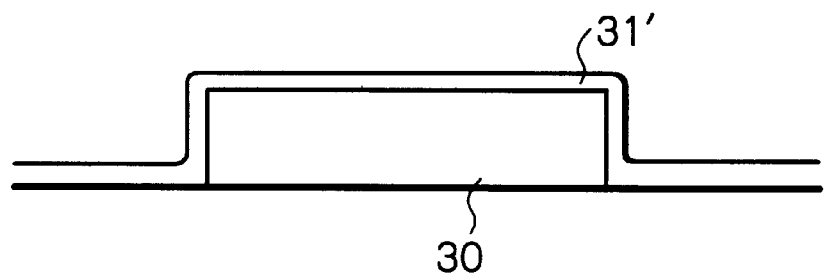
Figure 4C:
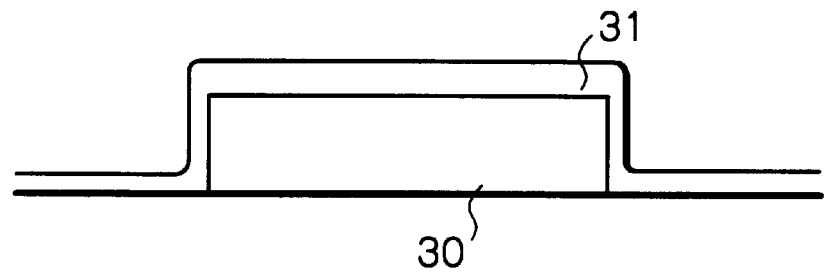

Then, as shown in FIG. 4b, an insulation layer 31' is formed on the layer 30 and on the under layer. This insulation layer 31' is formed by the same processes as the formation of the shield gap insulation layer of the MR head. Therefore, the layer 31' is made of the same material and provided with the same thickness as those of the shield gap insulation layer. Then, as shown in FIG. 4c, on the insulation layer 31' of only the lapping control sensor, an insulation material is further deposited by using a lift off process or the like so as to form an insulation layer 31 having a thickness of for example 0.1 μm or more, which is greater than that of the insulation layer in other areas. The insulation layer 31 having such a greater thickness may be formed on only the lapping control sensor as mentioned above, or on any area other than the MR head area.

Figure 4D:
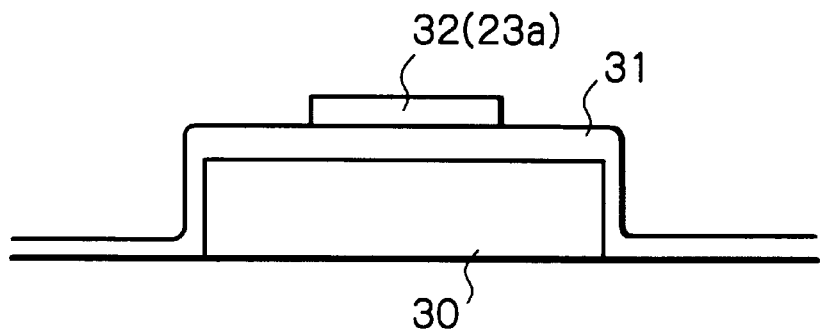

Then, as shown in FIG. 4d, the resister layer 32 (23a) is formed on the insulation layer 31. This resister layer 32 (23a) is also formed by the same processes as the formation of the MR layer of the MR head. Therefore, the resister layer 32 (23a) is made of the same material and provided with the same thickness as those of the MR layer. Then, as shown in FIG. 3, the lead conductors 33 (23b) and 34 (23c) connected across the resister layer 32 (23a) are formed. These lead conductors 33 (23b) and 34 (23c) are also formed by the same processes as the formation of lead conductors of the MR head. Therefore, the lead conductors 33 (23b) and 34 (23c) are made of the same material and provided with the same thickness as those of the lead conductors of the MR head.

In this embodiment of the present invention, the insulation layer of the lapping control sensor is formed to have a thickness of 0.1 μm or more which is greater than the thickness of the shield gap insulation layer of the MR head. Therefore, when the bar 20 is lapped from the ABS surface 20a side to control the MR height using this sensor, the formation of short circuits between the lead conductors 33 (23b) and 34 (23c) due to smears produced can be prevented. Therefore, the generation of noises in detecting outputs can be also securely prevented.

FIG. 5 illustrates relationships between a thickness of the insulation layer of the lapping control sensor and an error ratio of the resistance measurement. Marks □ and X represent characteristics of lapping control sensors with the metallic layers 30 made of different materials, respectively. the error ratio of the resistance measurement is given from the number of continuous abnormal measurements divided by the total number of measurements. The measurement period of resistance is 0.1 sec. The number of continuous abnormal measurements means the number of measurements in which measured values of resistance did not continuously indicate normal resistance values during lapping process of the same bar. The normal resistance value means that the measured value of resistance is larger than the last measured value (the value measured at 0.1 sec. before) and that the measured value of resistance is larger than the maximum measured value of resistance measured during the lapping process of the same bar.

It has been found from experience that when the error ratio of resistance measurement is larger than 1.5%, a lapping control using a lapping control sensor becomes impossible. Thus, it is necessary from FIG. 5 that the thickness of the insulation layer of a lapping control sensor is 0.1 $\mu$m or more.

Figure 6A:
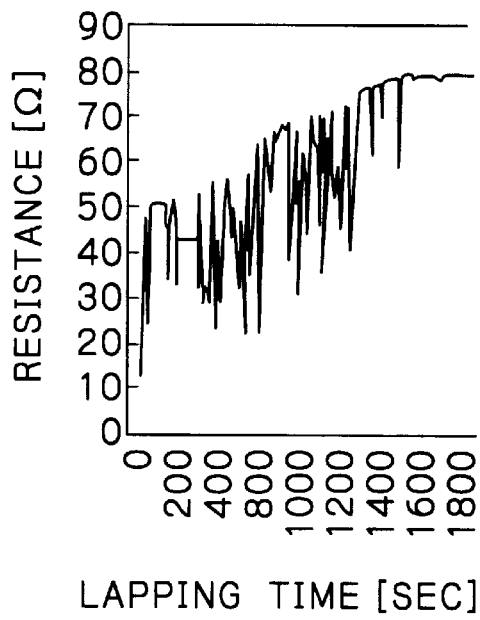
FIGS. 6a to 6c are characteristic diagrams of the change in measured values of resistance with respect to lapping time when the thickness of the insulation layer is small.
Figure 6B:
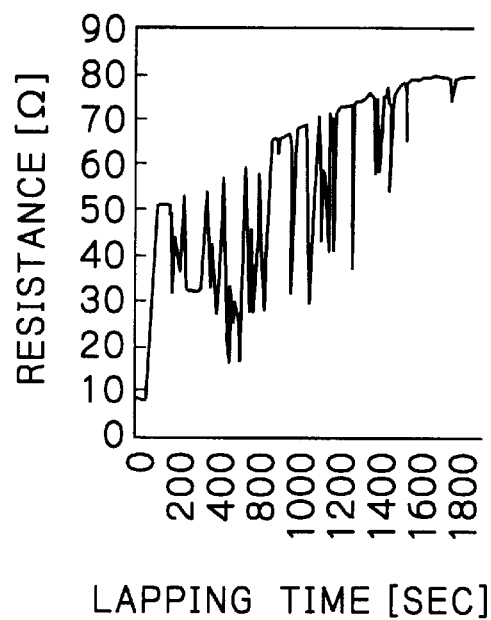
Figure 6C:
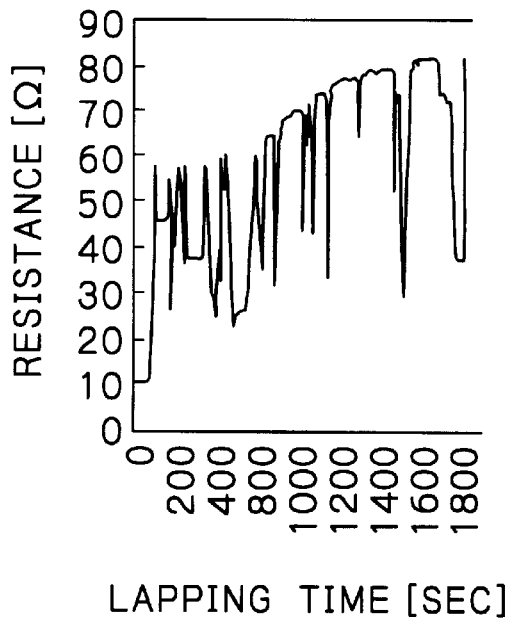
Figure 7A:
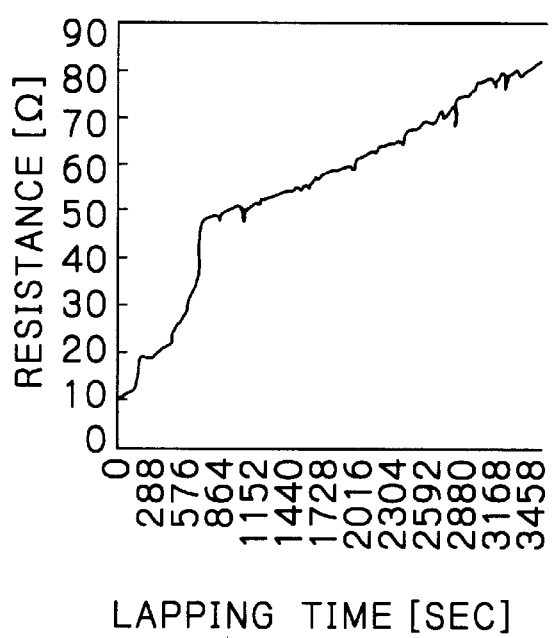
FIGS. 7a to 7c are characteristic diagrams of the change in measured values of resistance with respect to lapping time when the thickness of the insulation layer is large.
Figure 7B:
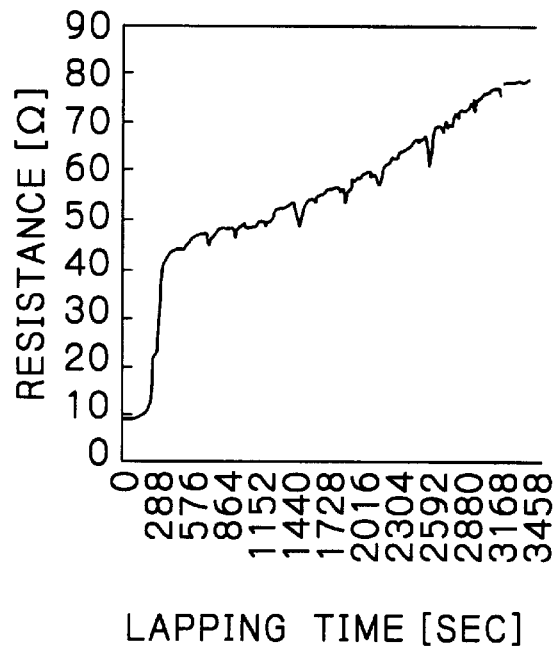
Figure 7C:
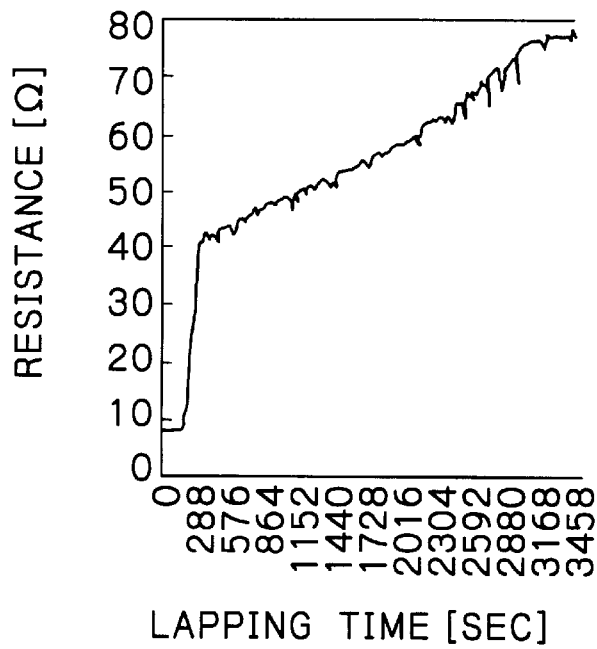

FIGS. 6a to 6c indicate change in measured values of resistance with respect to lapping time for various samples of the lapping control sensor with a thin insulation layer having a thickness of 0.08 $\mu$m. Whereas FIGS. 7a to 7c indicate change in measured values of resistance with respect to lapping time for various samples of the lapping control sensor with a thick insulation layer having a thickness of 0.1 $\mu$m or more.

As apparent from FIGS. 6a to 6c and FIGS. 7a to 7c, when the insulation layer is thin as 0.08 $\mu$m, a large amount of noise is found in measured values of resistance. However, when the insulation layer is thick as 0.1 $\mu$m, no noise is found and measured values of resistance are increased in accordance with passage of time. Therefore, by executing the lapping control using the latter lapping control sensor, it can be securely and stably control an MR height of the MR head to a corrective value.

Since the MR head has a thin shield gap insulation layer, smears may be produced during controlling the MR height, resulting that the smears may produce short circuits between lead conductors of the MR head. However, since the method of manufacturing the MR head includes the steps of controlling the MR height without using lead conductors and removing such smears, no problems occur.

Many widely different embodiments of the present invention may be constructed without departing from the spirit and scope of the present invention. It should be understood that the present invention is not limited to the specific embodiments described in the specification, except as defined in the appended claims.

What is claimed is:

1. A lapping control sensor used to control a height of a magnetoresistive effect head, when the magnetoresistive effect head is fabricated the magnetoresistive effect head has a shield gap insulation layer on top of a lower shield layer, a magnetoresistive effect layer on top of the shield gap insulation layer, and at least one lead conductor layer also placed on top of the shield gap insulation layer adjacent to the magnetoresistive effect layer, said lapping control sensor comprising a metallic layer, an insulation layer on top of said metallic layer, a resistor layer on top of said insulation layer and at least one lead conductor layer placed on top of said insulation layer adjacent said resister layer, said lapping control sensor being provided in parallel with the magnetoresistive effect head, wherein said insulation layer of said lapping control sensor has a thickness greater than that of the shield gap insulation layer of said magnetoresistive effect head, wherein said thickness of said insulation layer of said lapping control sensor is at least 0.1 $\mu$m.

2. The lapping control sensor as claimed in claim 1, wherein said lapping control sensor is located near the magnetoresistive effect head.

3. The lapping control sensor as claimed in claim 1 wherein said metallic layer, said insulation layer, said resister layer and said lead conductor layer of said lapping control sensor are each made of a same material as that of the lower shield layer, the shield gap insulation layer, the magnetoresistive effect head, respectively.

4. The lapping control sensor as claimed in claim 3, wherein said lapping control sensor is located near the magnetoresistive effect head.

5. A lapping control method using the sensor as claimed in claim 1, wherein lapping control of a height of the magnetoresistive effect layer of the magnetoresistive effect head is executed in response to a signal from said lapping control sensor.

6. A lapping control method using the sensor as claimed in claim 3, wherein lapping control of a height of the magnetoresistive effect layer of the magnetoresistive effect head is executed in response to a signal from said lapping control sensor.

7. A lapping control sensor comprising:
a metallic layer, an insulation layer on top of said metallic layer, a resister layer on top of said insulation layer and at least one lead conductor layer on top of said insulation layer said adjacent resister wherein said insulation layer has a thickness at least 0.1 $\mu$m.

8. The sensor as claimed in claim 7, wherein the sensor is used for lapping control of a magnetoresistive effect head.

9. The sensor as claimed in claim 8, wherein the sensor is formed on a wafer in parallel with said magnetoresistive effect head which has a shield gap insulation layer on top of a lower shield layer, a magnetoresistive effect layer on top of the shield gap insulation layer, and at least one lead conductor layer also placed on top of the shield gap insulation layer adjacent to the magnetoresistive effect layer.

10. The sensor as claimed in claim 9, wherein the sensor is located near said magnetoresistive effect head.

11. The sensor as claimed in claim 9, wherein the thickness of said insulation layer of the lapping control sensor is greater than a thickness of said shield gap insulation layer of said magnetoresistive effect head.

12. The sensor as claimed in claim 9, wherein said metallic layer, said insulation layer, said resister layer and said lead conductor layer of the lapping control sensor are each made of a same material as that of said lower shield layer, said shield gap insulation layer, said magnetoresistive effect layer and said lead conductor layer of said magnetoresistive effect head, respectively.

13. A lapping control method using the sensor as claimed in claim 9, wherein lapping control of a height of said magnetoresistive effect layer of said magnetoresistive effect head is executed in response to a signal from said lapping control sensor.

* * * * *